(No Model.) 3 Sheets—Sheet 1.

J. H. EDWARDS.
STRUCTURAL BEAM.

No. 562,175. Patented June 16, 1896.

Witnesses:
H. Mallner
Ed. E. Claussen

Inventor:
J. H. Edwards
By his Attorney
W. H. Honiss (No Model.) 3 Sheets—Sheet 2.

J. H. EDWARDS.
STRUCTURAL BEAM.

No. 562,175. Patented June 16, 1896.

Witnesses:

Inventor:
J. H. Edwards
By his Attorney (No Model.)  J. H. EDWARDS.  3 Sheets—Sheet 3.
STRUCTURAL BEAM.

No. 562,175.  Patented June 16, 1896.

Witnesses:
H. Mallner
Ed. E. Claussen

Inventor:
J. H. Edwards
By his Attorney
W. H. Horliss

UNITED STATES PATENT OFFICE.

JAMES H. EDWARDS, OF BERLIN, CONNECTICUT.

STRUCTURAL BEAM.

SPECIFICATION forming part of Letters Patent No. 562,175, dated June 16, 1896.

Application filed April 26, 1894. Serial No. 509,167. (No model.)

*To all whom it may concern:*

Be it known that I, JAMES H. EDWARDS, a citizen of the United States, residing at East Berlin, in the county of Hartford and State of Connecticut, have invented certain new and useful Improvements in Structural Beams, of which the following is a full, clear, and exact specification.

This invention relates to new and improved structural beams, which in various modifications are adapted for use as columns, girders, and other members for constructive purposes. They are particularly adapted to resist torsional as well as lateral strains, and are therefore of special utility as cantalivers. The general form of their cross-section is that of a tubular central portion which may be circular or polygonal, reinforced on the side or sides exposed to lateral strains by longitudinal ribs of a form adapted to best resist those strains. They consist, preferably, of a continuous longitudinal central tubular portion formed of sectional members having outward flanges, and of longitudinal side ribs arranged alternately with said central members and secured thereto, certain of these longitudinal members being made tapering.

The drawings show various modified ways of arranging and combining the members of the column in accordance with my present invention, showing it in its adaptation to various uses and requirements.

Figure 1:
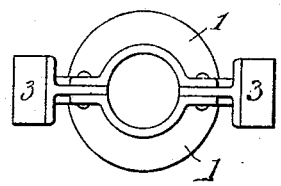
Figure 3:
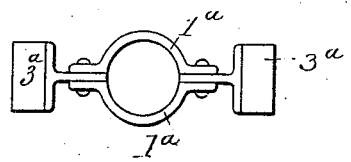
Figure 2:
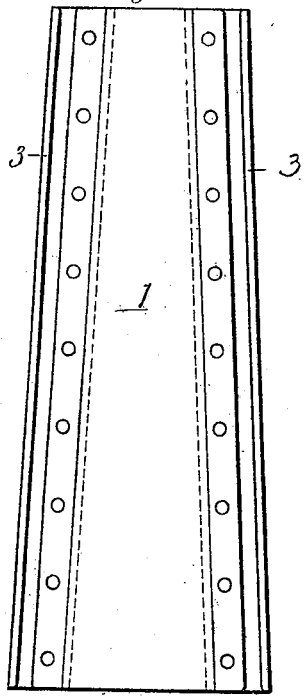
Figure 4:
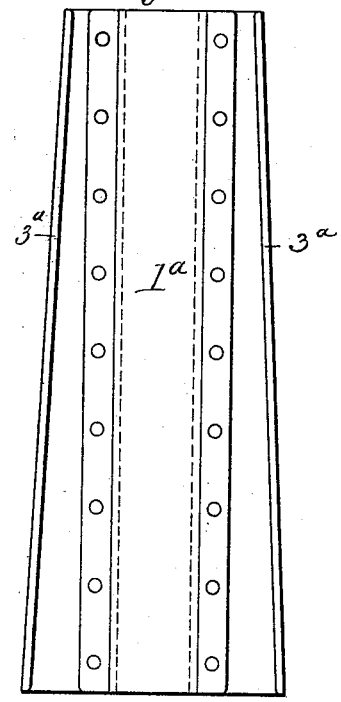
Figure 5:
Figure 6:
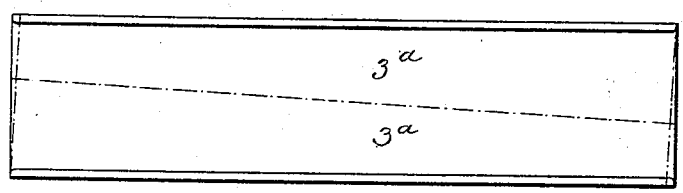
Figure 7:
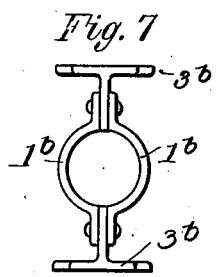
Figure 9:
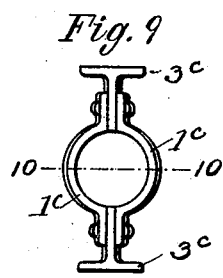
Figure 11:
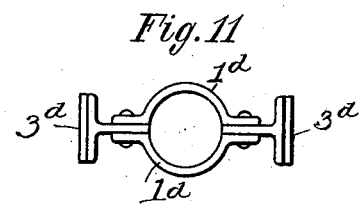
Figure 8:
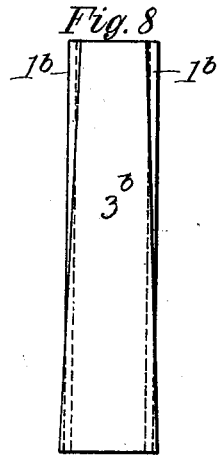
Figure 10:
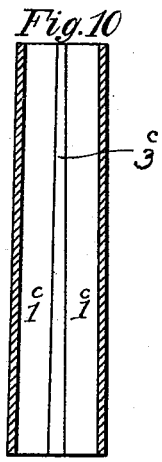
Figure 12:
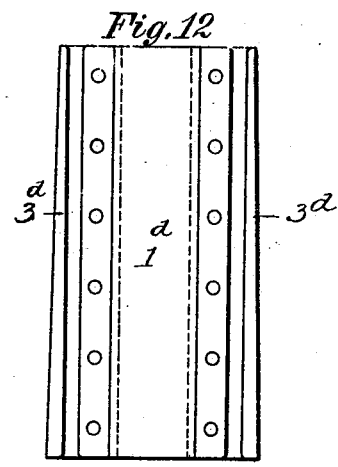
Figure 13:
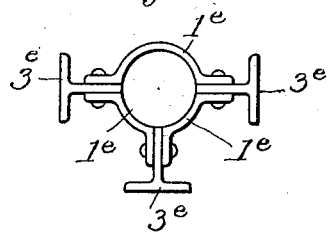
Figure 17:
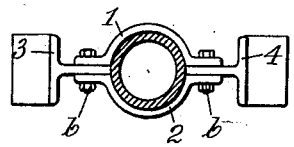
Figure 14:
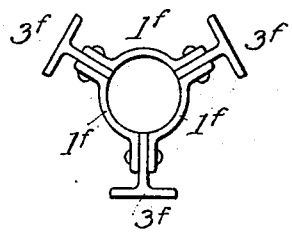
Figure 15:
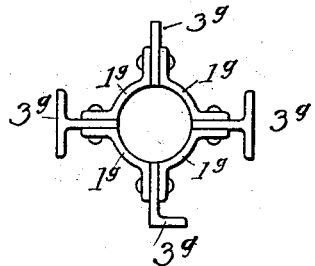
Figure 16:
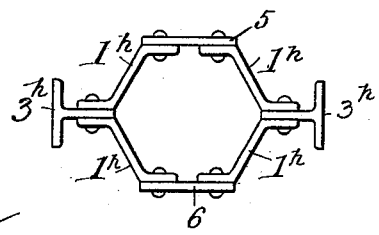
Figure 18:
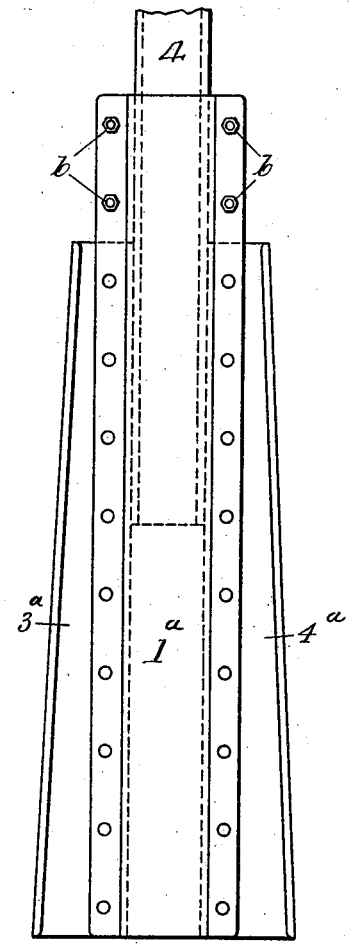

Figure 1 of the drawings is an end view, and Fig. 2 is a side view, of a beam in which the tubular central portion is made conical or tapering from one end toward the other. Figs. 3 and 4 are an end and a side view, respectively, of a beam in which the webs of the reinforcing T's are made wider at their bottom than at their top ends. Figs. 5 and 6 are an end view and a side view, respectively, of an I-beam adapted by shearing on the dot-and-dash lines thereof to form the tapering reinforcing T-ribs of Figs. 3 and 4. Figs. 7 and 8 are an end and a side view, respectively, of a beam in which the ribs of the reinforcing T's are made wider at one end than at the other. Fig. 9 is an end view, and Fig. 10 is a side view in longitudinal section, taken on the line 10 10 of Fig. 9, showing the beam in which the webs of the reinforcing T's are made tapering in thickness from one end toward the other. Figs. 11 and 12 are an end and a side view, respectively, of a beam in which the ribs of the reinforcing T's are made thicker at one end than at the other. Figs. 13, 14, and 15 are cross-sectional views of other structural forms of beam in which my invention may be utilized and in which the tubular central longitudinal portion thereof is reinforced by three or more side ribs instead of two, as in the views hereinbefore described. Fig. 16 shows a form of column in which the tubular portion may be built up of Z-bars and flat plates, any or all of which may be made tapering in one of the several ways set forth in this invention. Fig. 17 is an end view, and Fig. 18 is a side view, showing a structure embodying my invention adapted for use as a column or mast in connection with an adjustable tubular extension clamped therein, the adjustable extension being shown in cross-section in Fig. 17. The construction and arrangement of the column shown in these views is similar to that shown in Figs. 3 and 4; but it will be understood that any of the other forms herein shown are adapted to similarly receive and clamp an extensible member.

Most of the forms of my improved column are herein shown as being composed of members which are obtainable in commercial forms of rolled wrought iron or steel sections. It will, however, be understood that these beams may be made of cast-iron or any other metal best suited in point of strength and cost for the various purposes to which the column is to be adapted, and that the reinforcing-ribs may be cast integrally with the open-ended tubular portion.

The numerals 1, $1^a$, $1^b$, $1^c$, &c., in the different views indicate those members which form the tubular portion of my improved column, and which confers upon that column its principal stability against torsional strains. This tubular portion formed by these members is preferably circular in cross-section, as shown in the several figures of the drawings, but they may be made in the form of any polygon that may be best obtainable, or that may be best suited to harmonize with the rest of the structure in architectural appearance or style, or in mechanical adaptation thereto.

The side reinforcing-ribs 3, $3^a$, $3^b$, &c., are preferably made of a T-section, but may be made of angle-sections or of other forms best suited to the various uses of the column. Those ribs should be so located as to best resist the particular lateral strains to which the column is to be subjected. In some instances it may be desirable to use three or four of them, as shown in Figs. 13, 14, and 15.

The tubular form of the central longitudinal portions of the columns is one which adapts them to receive and firmly support adjustable stanchions or posts, as 4, which may be adjusted or extended with relation to the principal column, and clamped at any desired position thereon in the manner illustrated in Figs. 17 and 18. Where it is desired that the posts shall be of any particular form of cross-section, the opening in the tubular portion of the column may be adapted thereto. These extensible posts are clamped at any desired position by means of bolts $b$, as shown in Figs. 17 and 18.

Of the various ways herein shown of constructing the beam with tapering members to adapt it to serve as a column or post, the forms shown in Figs. 3, 4, and 16 are those best adapted to be made of wrought iron or steel sections of forms obtainable at the present time. The reinforcing-ribs 3 (shown in Figs. 3 and 4) have a tapering web, which is obtained by shearing an I-beam like that shown in Figs. 5 and 6 along the dotted lines shown in the latter figure. It is, however, confidently believed that improvements already made, or to be made, in the processes of manufacturing structural steel and iron will admit of the use of sections tapered like those shown in Figs. 1 and 2, and in Figs. 7 to 12 inclusive.

I claim as my invention—

1. A structural beam or column, consisting of a continuous longitudinal central tubular portion formed of sectional members having outward flanges, and of longitudinal side ribs arranged alternately with said central members and secured thereto, certain of said longitudinal members being made tapering.

2. A structural beam or column, consisting of a continuous central tubular portion formed of sectional members having outward flanges, and of longitudinal tapering side ribs arranged alternately with said central members and secured thereto, substantially as described.

3. A beam or column consisting of an open-ended continuous tubular portion, formed of two oppositely-disposed sections, having outward flanges between and to which are secured ribs of T-section, an extending member adjustably fitted within the tubular portion of the column, with means adapted to clamp the two sections of that tubular portion upon the extending member, substantially as described.

JAMES H. EDWARDS.

Witnesses:
W. H. HONISS,
WILLIAM A. LORENZ.